US006996986B2

(12) United States Patent
Arnold

(10) Patent No.: US 6,996,986 B2
(45) Date of Patent: Feb. 14, 2006

(54) CONTROL SYSTEM FOR VARIABLE GEOMETRY TURBOCHARGER

(75) Inventor: Steven Don Arnold, Rancho Palos Verdes, CA (US)

(73) Assignee: Honeywell International, Inc., Morristown, NJ (US)

( * ) Notice: Subject to any disclaimer, the term of this patent is extended or adjusted under 35 U.S.C. 154(b) by 304 days.

(21) Appl. No.: 10/199,703

(22) Filed: Jul. 19, 2002

(65) Prior Publication Data

US 2004/0011035 A1   Jan. 22, 2004

(51) Int. Cl.
F02D 23/00 (2006.01)
(52) U.S. Cl. .......................... 60/602; 60/605.1; 60/611
(58) Field of Classification Search ................. 60/601, 60/602, 603, 605.1, 611
See application file for complete search history.

(56) References Cited

U.S. PATENT DOCUMENTS

| | | |
|---|---|---|
| 4,186,560 A | 2/1980 | Frankl |
| 4,685,302 A | 8/1987 | Abo et al. |
| 6,058,707 A | 5/2000 | Bischoff |
| 6,067,798 A * | 5/2000 | Okada et al. ................. 60/602 |
| 6,067,799 A | 5/2000 | Heinitz et al. |
| 6,067,800 A * | 5/2000 | Kolmanovsky et al. ....... 60/602 |
| 6,089,018 A | 7/2000 | Bischoff et al. |
| 6,134,888 A | 10/2000 | Zimmer et al. |
| 6,134,890 A | 10/2000 | Church et al. |
| 6,161,384 A | 12/2000 | Reinbold et al. |
| 6,233,934 B1 | 5/2001 | Church et al. |
| 6,256,993 B1 | 7/2001 | Halimi et al. |
| 6,272,859 B1 * | 8/2001 | Barnes et al. ................. 60/602 |
| 6,314,736 B1 | 11/2001 | Daudel et al. |
| 6,338,250 B1 | 1/2002 | Mackay |
| 6,397,597 B1 | 6/2002 | Gartner |
| 6,526,752 B1 * | 3/2003 | McKinley et al. ......... 60/605.2 |
| 6,588,210 B1 * | 7/2003 | Kreso ........................... 60/602 |
| 6,594,990 B1 * | 7/2003 | Kuenstler et al. ............. 60/295 |

FOREIGN PATENT DOCUMENTS

| | | |
|---|---|---|
| JP | 03011126 | 1/1991 |
| WO | WO 99/40303 | 8/1999 |

* cited by examiner

Primary Examiner—Hoang Nguyen
(74) Attorney, Agent, or Firm—Chris James

(57) ABSTRACT

A control system of this invention for use with a variable geometry turbocharger is designed to enable turbocharger control based solely on engine speed. The control system takes measured engine speed and sends the same to an engine control unit (ECU) having an actuator position v. engine speed map. The ECU utilizes only the measured engine speed to determine a desired actuator position from the map, and produces a control signal for effecting actuator operation. The control signal generated by the ECU can be converted to an analog signal by pulse width modulation, for example. The control signal is sent to an actuator for placing the actuator into the desired actuator position. The actuator is connected to a variable geometry member in the turbocharger so that operation and placement of the actuator into the desired actuator position thereby places the variable geometry member into a desired position to effect the desired change in turbocharger operation. In an example embodiment, the variably geometry member is a number of movable vanes that can be positioned to change the amount of exhaust gas flow directed to a turbine wheel of the turbocharger.

15 Claims, 3 Drawing Sheets

CONTROL SYSTEM FOR VARIABLE GEOMETRY TURBOCHARGER

FIELD OF THE INVENTION

The present invention relates generally to the field of variable geometry turbochargers and, more particularly, to a method and system for providing improved boost control for variable geometry turbochargers.

BACKGROUND

Turbochargers are devices that are frequently used to increase the output of an internal combustion engine. A typical turbocharger comprises a turbine wheel coupled to a compressor impeller by a common shaft. Exhaust gas from the engine is diverted into a turbine housing of the turbocharger and through an inlet nozzle. The exhaust gas is directed onto the turbine wheel, causing it to spin, which in turn spins the common shaft and the compressor impeller.

The compressor impeller is disposed within a compressor housing having an air inlet and a pressurized or boosted air outlet. The spinning compressor impeller operates to pressurize air entering the compressor housing and generate a pressurized or boosted air stream that is directed into an inlet system of the internal combustion engine. This boosted air is mixed with fuel to provide a combustible mixture within the combustion chambers of an engine. In this manner, the turbocharger operates to provide a larger air mass and fuel mixture, than otherwise provided via an ambient pressure air intake stream, that results in a greater engine output during combustion. The gain in engine output that can be achieved is directly proportional to the increase in intake air flow pressure generated by the turbocharger. However, allowing the boost pressure to reach too high a level can result in severe damage to both the turbocharger and the engine, particularly when the engine has to operate beyond its intended performance range.

Thus, an objective of turbocharger design is to regulate or control the boost pressure provided by the turbocharger in a manner that optimizes engine power output at different engine operating conditions without causing engine damage. A known technique for regulating boost pressure is by using a turbocharger having a variable geometry member that functions to control the amount of exhaust gas directed to the turbine wheel. Turbochargers comprising such variable geometry members are referred to as variable geometry turbochargers (VGTs).

One type of VGT includes a variable geometry member in the form of multiple adjustable-position vanes that are positioned within the turbine housing, and that are movable within in inlet nozzle of the turbine housing to regulate the amount of exhaust gas that is passed to the turbine wheel. The vanes in this type of VGT can be opened to permit greater gas flow across the turbine wheel, causing the turbine wheel to spin at a higher speed and raise the boost pressure, or closed to restrict exhaust gas flow to the turbine, thereby reducing the boost pressure. Thus, the amount of boost pressure generated by this type of VGT can be regulated by varying the vane position so as to optimize engine output while avoiding engine damage.

Control systems for such VGTs are known in the art, and typically involve a closed-loop control methodology that involves an iterative process of monitoring a number of engine and turbocharger operating parameters, and providing a control output based on such inputs. For example, such control system may include a number of sensors to measure such parameters as actual boost pressure, fuel flow, ambient air pressure, engine speed, and the like, and may involve using a boost map for the purpose of comparing the actually-measured boost pressure to desired boost pressures at particular engine operating conditions. Using these parameters and/or stored data, such control systems operate to adjust the vane position to regulate the flow of exhaust across the turbine wheel to match the actual boost pressure to the desired boost pressure.

Although effective, conventional VGT control systems tend to be complicated and expensive to implement, for example, based on the relatively large number of sensors needed to monitor the desired operating parameters, and based on the significant number of calculations that must be performed to achieve the desired control output. Additionally, because such conventional systems are based on a closed-loop control methodology, certain stability issues and challenges are known to exist.

It is, therefore, desired that a control system for use with VGTs be designed and constructed in a manner that can provide relatively cost effective, efficient, and simple control of turbocharger operation. It is also desired that such control system provide reliable position control, of variable geometry members within such VGT, regardless of variabilities that can exist on the variable geometry members, e.g., such as external forces or hydraulic pressures.

SUMMARY OF THE INVENTION

Control systems and methods for using the same with a variable geometry turbocharger (VGT) are provided according to the principles of this invention. The system measures the speed of an internal combustion engine, coupled to the VGT, and directs the measured speed to an engine control unit (ECU). The ECU includes a desired actuator position v. engine speed map, and uses the map to arrive at a desired actuator position based on the measured engine speed. The ECU generates a control signal via a suitable driver that is directed to an actuator for the purposes of causing the actuator to be placed into the desired actuator position. The actuator is coupled to one or more variable geometry members in the VGT to move the same into a desired position to provide a desired VGT output and related engine operation.

In one embodiment of the invention, the desired actuator position as determined by the ECU and as matched to the measured engine speed, corresponds to an optimal geometry for the variable geometry member within the VGT. In another embodiment of the invention, the desired actuator position can be converted to an analog signal by pulse width modulation by a D/A converter in the ECU. The actuator is then set according to the desired actuator position determined by the ECU. Subsequently, the actuator adjusts the vane position of the VGT so as to control the exhaust gas flow into the turbine.

BRIEF DESCRIPTION OF THE DRAWINGS

The invention will be more clearly understood with reference to the following drawings wherein.

DETAILED DESCRIPTION OF THE INVENTION

Control systems, constructed according to principles of this invention, for variable geometry turbochargers (VGTs) are specifically designed to govern the flow of exhaust gas to a turbine wheel in the turbocharger, thereby controlling pressurized air output by the turbocharger, based solely on measured engine speed. Configured in this manner, control systems of this invention provide a relatively cost efficient, effective, and simple method of controlling turbocharger and engine operation.

Figure 1:
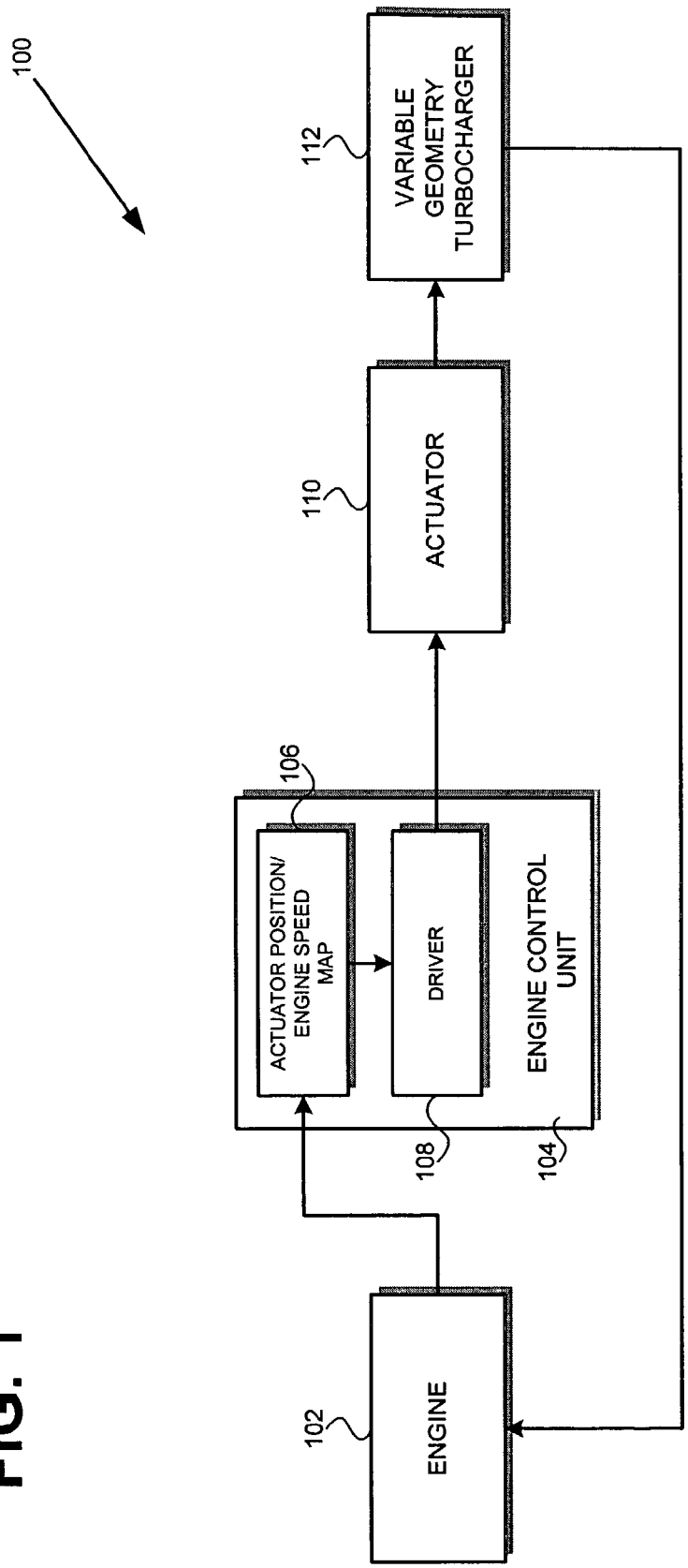
FIG. 1 is a block diagram illustrating a control system, according to principles of this invention, for a variable geometry turbocharger.

FIG. 1 illustrates a turbocharged internal combustion engine system 100 comprising a control system of this invention. The engine system 100 comprises a conventional gasoline or diesel-powered engine 102, an engine control unit (ECU) 104, an actuator 110, and a VGT that is placed in air and exhaust flow communication with the engine. In a preferred embodiment, the ECU 104 comprises a map 106 that includes desired actuator position v. engine speed information. A driver 108 is configured to provide a driving or actuating signal taken from the ECU to the actuator 110.

Control systems of this invention can be used with VGTs having one or more variable geometry members disposed therein for the purpose of regulating turbocharger operation. In an example embodiment, the variable geometry member can be configured to regulate the flow of exhaust gas entering the turbocharger and being directed to a turbine wheel disposed within the turbocharger turbine housing. The variable geometry member can be in the form of a number of aerodynamic vanes that are movably disposed within an inlet nozzle of the turbine housing. An example of such VGT is disclosed in U.S. Pat. No. 6,269,642, and which is incorporated herein by reference.

In such example VGT embodiment, the movable vanes are positioned upstream from the turbine wheel to govern the amount of exhaust gas that is directed to the turbine wheel. The position of the vanes within the turbine housing is adjusted by a unison ring that is configured to move or pivot the vanes in unison. The unison ring is moved within the turbocharger to effect the desired vane movement by the actuator 110.

The actuator 110 can be of any suitable design known in the art, for example, a position-dependent actuator. A suitable actuator design is disclosed in U.S. Pat. No. 6,269,642. Alternatively, the actuator 110 can be an electrical actuator with position feedback configured to communicate with the ECU 104 as part of a controller area network (CAN), which is a communication standard frequently used for in-vehicle control.

By way of background, it is known in the art that fixed geometry turbochargers can be designed to operate most optimally at a particular engine load and speed. Through a matching process, for example, designers are able to determine the particular configuration of a turbocharger's inlet nozzle to yield a turbine flow curve that will generate a desired boost pressure at a particular engine speed and load. Subsequently, the determination is incorporated into the turbocharger's design. However, the performance of such a fixed geometry turbocharger is compromised when the turbocharger has to operate over a range of engine speed and load. This is so because the turbine flow characteristics of such fixed design cannot be adjusted to account for the changing engine speed and load. For example, a fixed geometry turbocharger matched to an engine's low speed range is susceptible to overspeeding when the engine operates at higher speeds and loads.

VGTs are designed to overcome the shortcomings of fixed geometry turbocharger designs by allowing for adjustments to be made to the turbine flow characteristic based on engine operation. As has been described above for the example embodiment VGT, movable vanes positioned around the turbocharger's inlet nozzle are incrementally pivoted, or actuated, by an actuator in response to a host of different parameters such as, for example, actual boost pressure, ambient air pressure, fuel requirement, and the like. These different parameters are considered "on the fly", and the geometry of the turbocharger is adjusted accordingly, typically by way of a highly complicated and involved actuating mechanisms.

It has been determined, however, that the turbine flow characteristic of such VGT is a strong function of engine speed, and that effective VGT performance can be achieved, for example, by positioning the vanes based solely on engine speed. Thus, as described below, the control system of the present invention is able to exploit the strong relationship that exists between engine speed and optimal turbocharger geometry to control vane position in a VGT to effectively control the level of boost pressure generated by the turbocharger.

Referring again to FIG. 1, the speed of the engine 102 is measured by conventional measuring or sensing means. The measured speed is sent to the ECU 104, and more particularly, to the map 106 of desired actuator position v. engine speed data. The map 106, which can be stored in a non-volatile memory component in the ECU 104, for example, plots desired actuator positions for a range of engine speeds. In other words, the map 106 contains a corresponding desired actuator position for each engine speed that is measured from the engine 102 and sent to the ECU 104. In one embodiment of the control system, the desired actuator position (that corresponds to the measured engine speed) is directed to the actuator to generate optimal boost for the engine operating at the particular engine speed.

Once a desired actuator position has been determined from the map 106 (based on the speed of engine 102), the desired actuator position can be relayed to driver 108. In one embodiment, the driver 108 is a digital/analog converter configured to convert the signal from map 106 into an analog signal by pulse code modulation. Alternatively, in another embodiment, the driver 108 is a dithered current driver. The signal provided by the driver 108 is then used to control the operation and position of the actuator 110.

In response to the signal from the driver 108, the actuator 110 is moved to adjust the vane position within the VGT to control the flow of exhaust to the turbine wheel. The control of exhaust flow to the turbine wheel operates to control the level of boost pressure generated by VGT 110 in a compressor housing by a compressor impeller. In this manner, the boost supplied to the engine 102 by the VGT 112 is effectively controlled based only on the speed of engine 102.

Figure 2:
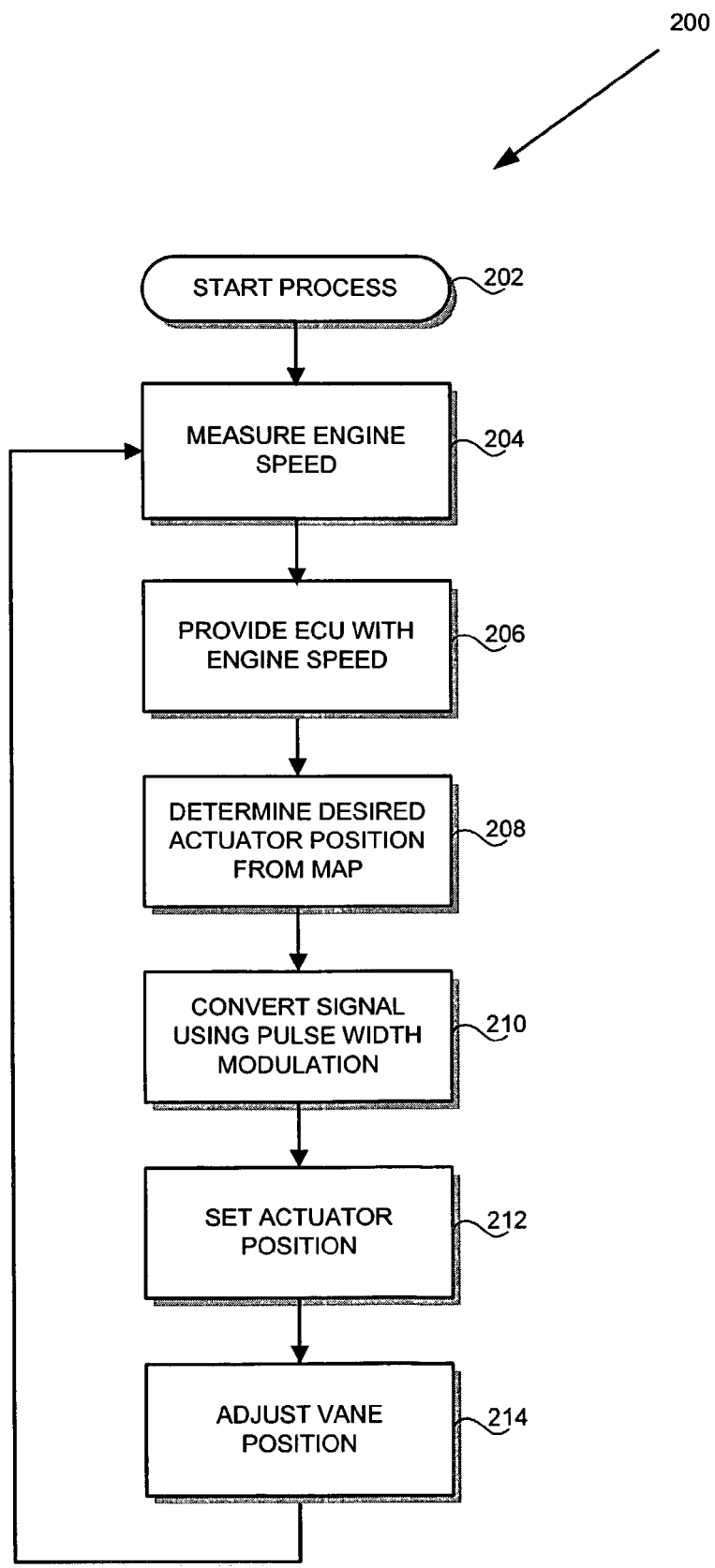
FIG. 2 is a flowchart illustrating a control methodology of a control system of this invention for a variable geometry turbocharger.

FIG. 2 illustrates a number of steps used for implementing a example control system 200 for a VGT according to the practice of this invention, wherein the geometry of the VGT is adjusted based on engine speed. The control system 200 can be implemented in an engine system such as that described above and illustrated in FIG. 1.

The control system 200 begins at step 202 where the control process is started. A first step 204 in the process is to measure the speed of the engine. The engine speed can be measured using a suitable means known in the art such as, for example, by way of a sensor. The measured engine speed is then directed or at step 206 to an ECU, which uses the engine speed to determine a desired geometry for a VGT coupled to the engine.

Once the engine speed has been measured at step 204 and provided to the ECU at step 206, then VGT control system 200 proceeds to step 208 where a preferred actuator position is determined based on the measured engine speed. In the present embodiment, the preferred actuator position can be determined by referring to a map in the ECU that plots desired actuator position against engine speed. The map can be, for example, an actuator position/engine speed map stored in a memory device in the ECU that contains desired actuator positions corresponding to different engine speeds. In one embodiment, for each engine speed, there is a desired actuator position. This actuator position corresponds to an optimal turbocharger geometry for the given engine speed. Turbocharger geometry for any corresponding engine speed can be optimized, for example, at full engine load, or alternatively at a range of engine loads. Determining the optimal turbocharger geometry for purposes of creating the map for the present embodiment can be done in a number of ways depending upon the key considerations (e.g., emissions, power, fuel consumption, etc.), such as through data sampling, each of which are well known to those skilled in the relevant technical field.

Next, at step 210, the preferred actuator position determined at step 208 is converted to a suitable signal for driving or operating an actuator. In an example embodiment, pulse width modulation can be performed, for example, by a digital/analog converter. The modulated signal is then used at step 212 to set the desired position of the actuator. The control system 200 then proceeds to step 214 where the position of the variable geometry member or members, e.g., movable vanes, in the VGT is adjusted by the actuator. As a result of the actuating process at step 214, the flow of exhaust gas into the turbocharger is controlled based only on the engine speed. Next, the control system 200 returns to step 204 where a new engine speed can be measured, and the control loop is repeated. Thus, FIG. 2 illustrates an exemplary control system which relies solely on the strong relationship between engine speed and desired turbocharger geometry.

Figure 3:
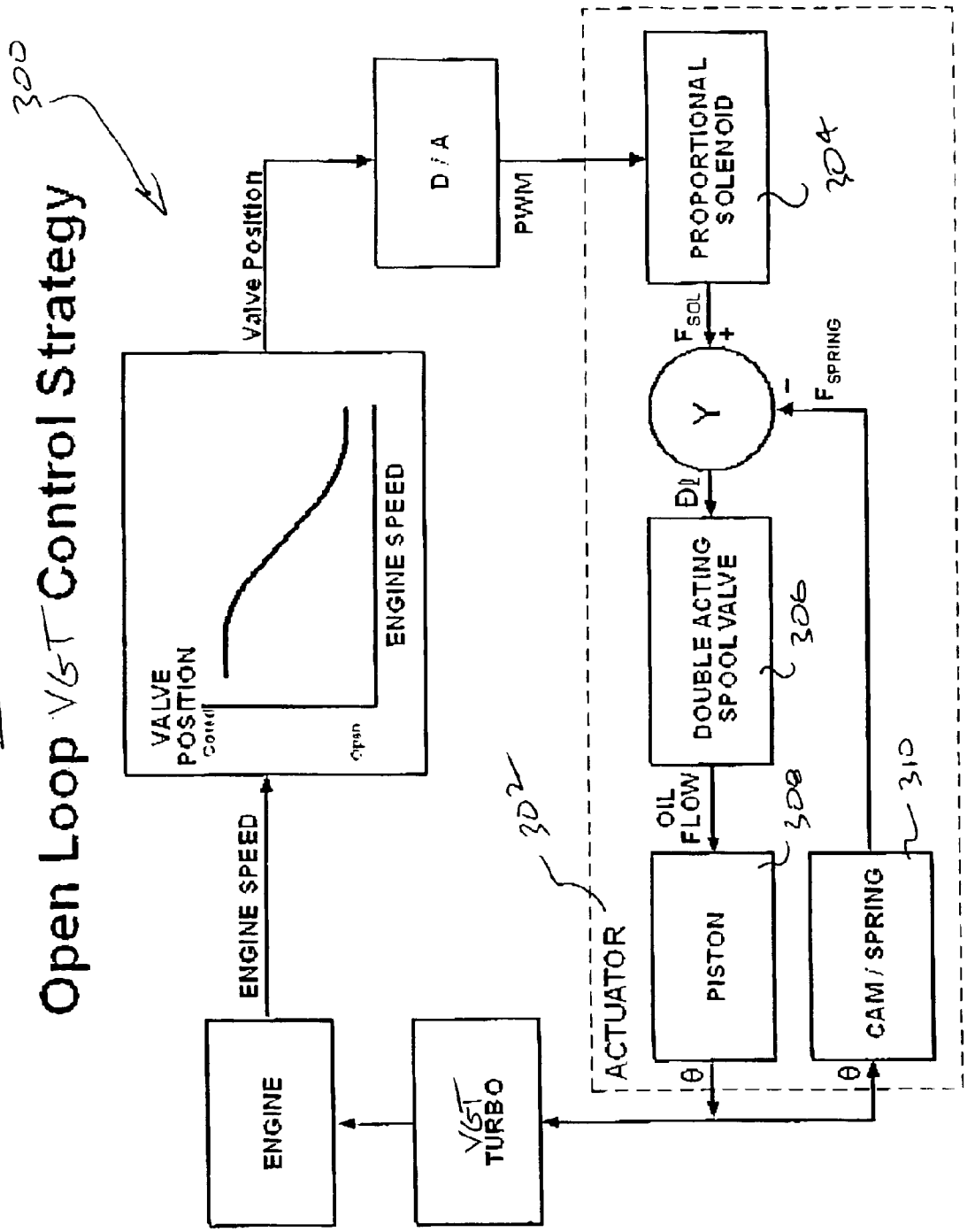
FIG. 3 is a block diagram of control system of this invention illustrating an actuator system as used therewith.

FIG. 3 illustrates the control system 300 of this invention as described above and as illustrated in FIGS. 1 and 2. More specifically, FIG. 3 illustrates in greater detail example members of the actuator 302 that are used to receive the control signal generated from the driver (108 in FIG. 1), and convert the control signal into a mechanical movement. In such example embodiment, these members include a proportional solenoid 304, a double acting spool valve 306, a piston 308 and a cam/spring assembly 310. Together, theses elements provide the desired actuator movement to the variable geometry member or members in the VGT.

It is appreciated from the above description that the present invention provides for system control to a VGT that can be easily implemented. Because the approach relies solely on engine speed as the basis for adjusting vane position, it requires significantly fewer sensors and connections than conventional VGT control strategies. Additionally, because engine speed is a relatively stable parameter, particularly when compared to boost pressure, for example, the variable geometry member position, e.g., vane position, is adjusted less frequently according to the present invention, resulting in less wear and greater durability.

From the above description of the invention it is manifest that various techniques can be used for implementing the concepts of the present invention without departing from its scope. Moreover, while the invention has been described with specific reference to certain embodiments, a person of ordinary skills in the art would appreciate that changes can be made in form and detail without departing from the spirit and the scope of the invention. The described embodiments are to be considered in all respects as illustrative and not restrictive. It should also be understood that the invention is not limited to the particular embodiments described herein but is capable of many rearrangements, modifications, and substitutions without departing from the scope of the invention.

What is claimed is:

1. A method for controlling a variable geometry turbocharger comprising a variable geometry member and an actuator for effecting movement of the same, said method comprising steps of:
   measuring the speed of an internal combustion engine in airflow communication with the turbocharger;
   determining a desired position of the turbocharger actuator based only on the engine speed; and
   adjusting the position of the turbocharger variable geometry member according to the desired actuator position.

2. The method as recited in claim 1 wherein the variable geometry member is in the form of movable vanes disposed within a turbine housing of the turbocharger, the vanes being positioned upstream from a turbine wheel in the turbine housing, and the step of adjusting comprises moving the position of the vanes to change an amount of exhaust gas flow directed to the turbine wheel.

3. The method as recited in claim 1 wherein said desired actuator position is determined from a map including desired actuator position v. engine speed information.

4. The method as recited in claim 1 wherein said desired actuator position corresponds to an optimal geometry for the turbocharger for the engine speed.

5. The method as recited in claim 1 further comprising a step of converting said desired actuator position into an analog signal by pulse width modulation method after said determining step and before said adjusting step.

6. The method as recited in claim 1 further comprising a step of converting said desired actuator position into a dithered current after said determining step and before said adjusting step.

7. The method as recited in claim 1 wherein said adjusting step regulates exhaust gas flow into said turbocharger.

8. A control system for a variable geometry turbocharger as used with an internal combustion engine, the turbocharger comprising a variable geometry member, and an actuator connected to the variable geometry member to change the position of the member, said system comprising:
   a sensor configured to measure the speed of the internal combustion engine:
   an engine control unit configured to receive the measured engine speed and to determine a desired actuator position based only on said engine speed; and
   means for providing a control signal from the engine control unit to the actuator to operate the actuator according to the desired actuator position to adjust the variable geometry member.

9. The control system as recited in claim 8 wherein the variable geometry member comprises a number vanes movably disposed within a turbine housing of the turbocharger and mounted upstream from a turbine wheel disposed within the turbine housing, and wherein the actuator is a unison ring that is attached to the vanes to effect movement of the vanes in unison.

10. The control system as recited in claim 8 further comprising an actuator position v. engine speed map, wherein said engine control unit is configured to determine said desired actuator position from said actuator position v. engine speed map.

11. The control system as recited in claim 8 wherein said desired actuator position corresponds to an optimal geometry for the turbocharger for the engine speed.

12. The control system as recited in claim 8 further comprising a driver configured to convert said desired actuator position into an analog signal by pulse width modulation.

13. The control system as recited in claim 8 further comprising a driver configured to convert said desired actuator position into a dithered current.

14. The control system as recited in claim 8 wherein said actuator adjusts the variable geometry member to regulate exhaust gas flow into the turbocharger.

15. The control system as recited in claim 8 further comprising a controller area network, wherein the actuator is an electrical actuator having position feedback and configured to communicate with the engine control unit in the controller area network.

* * * * *